(12) United States Patent
Tomar et al.

(10) Patent No.: US 12,288,188 B2
(45) Date of Patent: *Apr. 29, 2025

(54) SYSTEMS AND METHODS FOR OPTIMIZING SPACE UTILIZATION OF CONTAINERS AT RETAIL STORAGE FACILITIES

(71) Applicant: Walmart Apollo, LLC, Bentonville, AR (US)

(72) Inventors: Vivek Tomar, Cincinnati, OH (US); Rei E. Siew Hew Sam, New York, NY (US); Sunada SN Chakravarthy, Metuchen, NJ (US); Kaiwen Luo, Atlanta, GA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,071

(22) Filed: Mar. 7, 2024

(65) Prior Publication Data

US 2024/0211878 A1    Jun. 27, 2024

Related U.S. Application Data

(63) Continuation of application No. 18/101,791, filed on Jan. 26, 2023, now Pat. No. 11,954,641.

(Continued)

(51) Int. Cl.
*G06Q 10/087* (2023.01)
*G06Q 10/10* (2023.01)

(52) U.S. Cl.
CPC .................. *G06Q 10/087* (2013.01)

(58) Field of Classification Search
CPC ...... G06Q 10/087; G06Q 10/04; G06Q 10/08; G06Q 30/0633; B65G 1/1378; B65G 1/137

(Continued)

(56) References Cited

U.S. PATENT DOCUMENTS 6,688,459 B1    2/2004   Bonham
8,086,344 B1    12/2011  Mishra
(Continued)

FOREIGN PATENT DOCUMENTS

WO    2001027567    9/2001
WO    2020185081    9/2020
(Continued)

OTHER PUBLICATIONS

U.S. Appl. No. 18/586,296, filed Feb. 23, 2024, Vivek Tomar.
(Continued)

*Primary Examiner* — Garcia Ade
(74) *Attorney, Agent, or Firm* — Fitch, Even, Tabin & Flannery, LLP

(57) ABSTRACT

Automated storage and retrieval system for managing storage of inventory at a retail facility includes a storage structure with storage locations configured to store containers that contain retail products, and a conveying system that conveys the containers between the storage locations and a product picking station. A computing device analyzes one or more business rules to identify at least two containers that are eligible for the product merging therebetween and causes the conveying system to move these two containers from the storage structure toward a picking station selected by the control circuit. When the two containers identified as product merging eligible arrive at the picking station, these two containers are kept by the conveying system at the picking station until all of the products are removed from a first one of these two containers and merged together with the products stored in a second one of these two containers.

20 Claims, 6 Drawing Sheets

Related U.S. Application Data

(60) Provisional application No. 63/304,919, filed on Jan. 31, 2022.

(58) Field of Classification Search
USPC .......................................................... 705/28
See application file for complete search history.

(56) References Cited

U.S. PATENT DOCUMENTS

| | | |
|---|---|---|
| 8,234,006 B1 | 7/2012 | Sachar |
| 9,230,233 B1 | 1/2016 | Sundaresan |
| 9,460,524 B1 | 10/2016 | Curlander |
| 10,138,062 B2 * | 11/2018 | High .................. B25J 9/0093 |
| 10,246,275 B1 | 4/2019 | Lehmann |
| 10,339,491 B2 | 7/2019 | Wakim |
| 10,769,579 B1 | 9/2020 | Smith |
| 11,001,438 B2 | 5/2021 | Eisenman |
| 11,003,804 B2 | 5/2021 | Krishnamurthy |
| 11,049,086 B2 | 6/2021 | Brooks |
| 11,074,547 B2 | 7/2021 | Rajkhowa |
| 11,142,402 B2 | 10/2021 | Lert, Jr. |
| 11,948,120 B2 | 4/2024 | Tomar |
| 11,954,641 B2 | 4/2024 | Tomar |
| 12,013,686 B1 | 6/2024 | Parness |
| 2013/0218799 A1 | 8/2013 | Lehmann |
| 2015/0161317 A1 | 6/2015 | Moffitt |
| 2017/0043953 A1 * | 2/2017 | Battles .................. B65G 1/04 |
| 2018/0178992 A1 | 6/2018 | Gondoh |
| 2018/0194556 A1 * | 7/2018 | Lert, Jr. ............. G06Q 10/087 |
| 2018/0247257 A1 * | 8/2018 | Lert, Jr. ................. H04W 4/35 |
| 2018/0374046 A1 | 12/2018 | Powers |
| 2019/0233213 A1 | 8/2019 | Phan-Quiroga |
| 2019/0276176 A1 * | 9/2019 | Almogy ................ B65B 5/101 |
| 2019/0322454 A1 * | 10/2019 | Wan .................... B65G 1/1378 |
| 2019/0378232 A1 | 12/2019 | Goren |
| 2019/0389659 A1 * | 12/2019 | Grinnell .............. B65G 1/1373 |
| 2020/0039668 A1 * | 2/2020 | Que .......................... B65B 5/10 |
| 2020/0039746 A1 | 2/2020 | Lert, Jr. |
| 2020/0087010 A1 | 3/2020 | Almogy |
| 2020/0167727 A1 * | 5/2020 | Ikeda .................... G06Q 10/087 |
| 2020/0283245 A1 | 9/2020 | Gualtieri |
| 2020/0306973 A1 * | 10/2020 | Edwards .............. B65G 1/1373 |
| 2020/0379440 A1 | 12/2020 | Ziegler |
| 2020/0380746 A1 | 12/2020 | Natesan |
| 2021/0103886 A1 * | 4/2021 | Sezaki .................... B65G 1/137 |
| 2021/0149382 A1 | 5/2021 | Stadie |
| 2021/0158272 A1 | 5/2021 | Barr |
| 2021/0221619 A1 | 7/2021 | Lert, Jr. |
| 2021/0241209 A1 * | 8/2021 | Kim .................... G06Q 10/047 |
| 2021/0256460 A1 * | 8/2021 | Kim .................... G06K 7/1413 |
| 2022/0106121 A1 | 4/2022 | Puite |
| 2022/0135351 A1 | 5/2022 | Hickman |
| 2022/0164765 A1 | 5/2022 | Masche-Pakkala |
| 2023/0124552 A1 | 4/2023 | Sarkar |
| 2023/0245059 A1 | 8/2023 | Tomar |
| 2023/0281556 A1 | 9/2023 | Sunada |
| 2024/0193529 A1 | 6/2024 | Tomar |

FOREIGN PATENT DOCUMENTS

| | | |
|---|---|---|
| WO | 2021239559 A1 | 12/2021 |
| WO | 2021243059 A1 | 12/2021 |
| WO | 2023146940 | 8/2023 |
| WO | 2023146942 | 8/2023 |
| WO | 2023146950 | 8/2023 |
| WO | 2023146953 | 8/2023 |

OTHER PUBLICATIONS

GEEKSFORGEEKS; "Bin Packing Problem (Minimize number of used Bins)"; <https://www.geeksforgeeks.org/bin-packing-problem-minimize-number-of-used-bins/>; Jul. 28, 2021; pp. 1-17.

PCT; PCT/US23/11590; International Search Report and Written Opinion mailed Apr. 14, 2023; 13 pages.

U.S. Appl. No. 18/101,791; Non-Final Rejection mailed Sep. 14, 2023; (pp. 1-31).

U.S. Appl. No. 18/101,791; Notice of Allowance and Fees Due (PTOL-85) mailed Dec. 29, 2023; (pp. 1-9).

Van Aken, Margo; "An efficient bin-packing algorithm for packing groceries in a fulfillment center"; <https://repository.tudelft.nl/islandora/object/uuid%3Af4ee26b5-b94e-4cd3-9c7a-c281b0c8d8a8>; Mar. 8, 2019; 85 pages.

\* cited by examiner

SYSTEMS AND METHODS FOR OPTIMIZING SPACE UTILIZATION OF CONTAINERS AT RETAIL STORAGE FACILITIES

CROSS-REFERENCE TO RELATED APPLICATION

This application is a continuation of U.S. application Ser. No. 18/101,791, filed Jan. 26, 2023, which claims the benefit of U.S. Provisional Application No. 63/304,919, filed Jan. 31, 2022, which is incorporated herein by reference in its entirety.

TECHNICAL FIELD

This invention relates generally to managing product inventory and, in particular, to systems and methods for increasing space utilization of storage containers at retail facilities.

BACKGROUND

Consumers often place product orders over the internet from large retailers of consumer products. Such product orders are typically fulfilled at distribution centers of the retailer. Generally, at a distribution center, products move on a conveyor and are placed into storage containers/totes based on their intended destination(s). A disadvantage of such systems is that the products are not placed into the storage containers in a way that optimally uses the interior space of the storage containers/totes, resulting in many storage containers/totes being less than full when they leave the distribution center, which in turn requires the use of more delivery vehicles to transport the storage containers/totes from the distribution center. As such, a typical large distribution center may utilize thousands of storage containers/totes per year that would not have been necessary if the products were packed into the storage containers/totes more efficiently. This increases the cost of operation for both the distribution center and the product transport services.

BRIEF DESCRIPTION OF THE DRAWINGS

Disclosed herein are embodiments of systems, apparatuses and methods pertaining to managing automated product storage, product retrieval, and storage space utilization at a product distribution facility. This description includes drawings, wherein.

Figure 1:
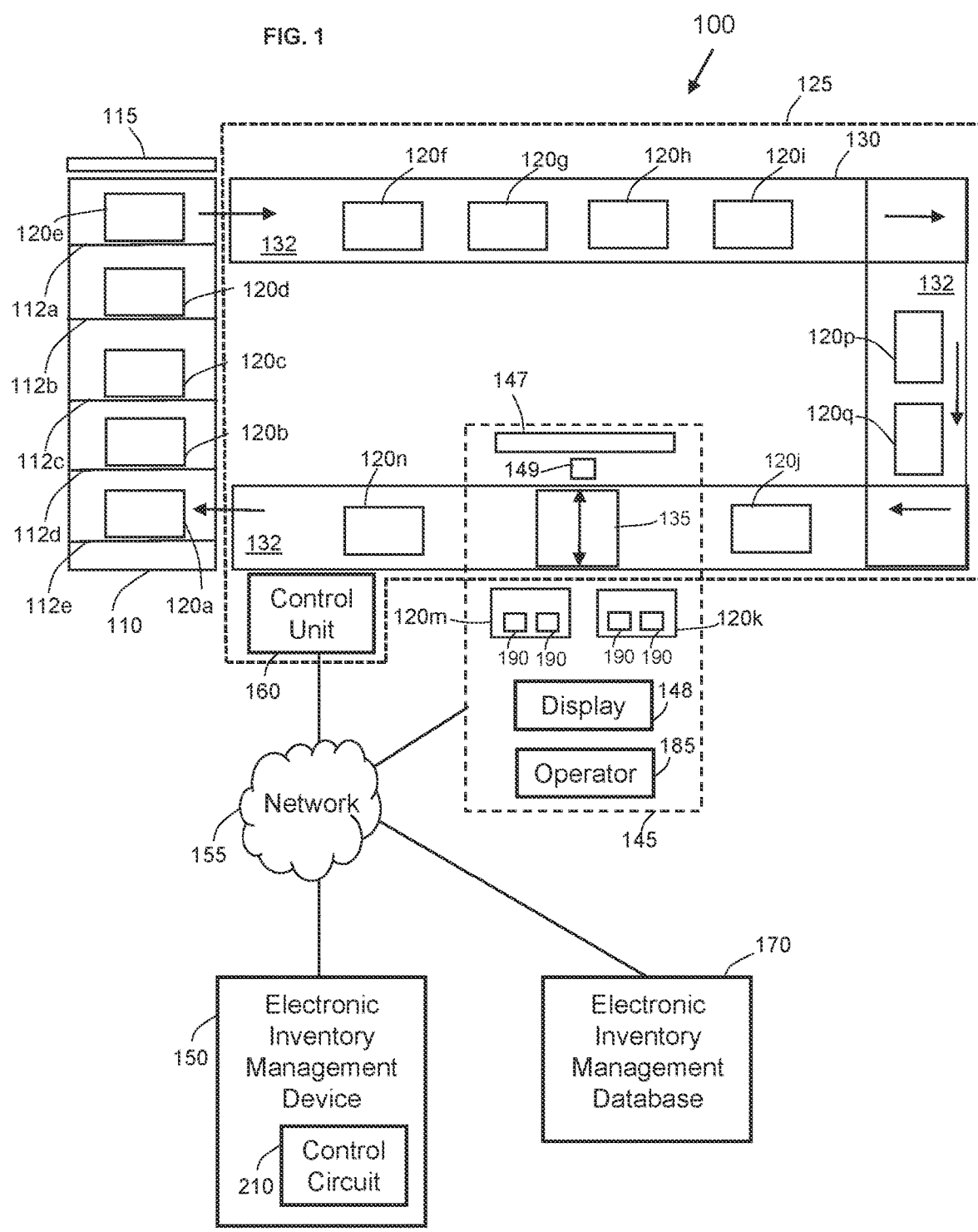
FIG. 1 is a diagram of a system of automated product storage, product retrieval, and storage space utilization at a product distribution facility in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this disclosure relates to an automated storage and retrieval system for managing storage of inventory at a retail facility. The system includes a storage structure with storage locations configured to store containers that contain retail products, and a conveying system that conveys the containers between the storage locations and a product picking station. A processor-based control circuit analyzes one or more business rules governing product merging between the containers stored at the storage locations in the storage structure to identify at least two containers that are eligible for the product merging therebetween and causes the conveying system to move these two containers from the storage structure toward a picking station selected by the control circuit. When the control circuit detects that the two containers identified as product merging eligible have arrived, via the conveying system, from the storage structure to the picking station, these two containers are kept by the conveying system at the picking station until all of the products are removed from a first one of these two containers and merged together with the products stored in a second one of these two containers.

In some embodiments, an automated storage and retrieval system for managing storage of inventory at a retail facility includes a storage structure including a plurality of storage locations configured to store a plurality of containers, each of the containers containing a plurality of products; a container transport system configured to transport the containers between the storage locations and at least one picking station, where one or more products are removed from one or more of the containers; a control unit operatively coupled to the container transport system and configured to control movement of the container transport system; and a control circuit communicatively coupled to the control unit. The control circuit is configured to analyze at least one business rule governing product merging between the containers stored at the storage locations in the storage structure to identify at least two containers that are eligible for the product merging therebetween. The control circuit is also configured to analyze the containers being transported by the container transport system and workload at the at least one picking station to determine whether the at least one picking station is available to accommodate the product merging between the at least two containers identified as being eligible for the product merging therebetween. The control circuit is also configured, upon an identification of the least two containers that are eligible for the product merging therebetween and upon a determination that the at least one picking station is available to accommodate the product merging between the at least two containers identified as being eligible for the product merging therebetween, to transmit a first signal to the control unit to cause the container transport system to remove the at least two containers identified as being eligible for the product merging therebetween from their storage locations in the storage structure and to transport the at least two containers removed from their storage locations in the storage structure toward the at least one picking station determined to be available to accommodate the product merging between the at least two containers. In addition, the control circuit is configured, upon detection that the at least two containers identified as being eligible for the product merging arrived at the at least one picking station determined to be available to accommodate the product merging between the at least two containers, to transmit a second signal to the control unit to cause the container transport system to keep the at least two containers that are eligible for the product merging at the at least one picking station until the product merging between the at least two containers is complete.

In some embodiments, a method of using an automated storage and retrieval system for managing storage of inventory at a retail facility includes: analyzing, by a control circuit of the automated storage and retrieval system, at least one business rule governing product merging between containers containing a plurality of products and stored at storage locations of a storage structure to identify at least two of the containers that are eligible for the product merging therebetween; and analyzing, by the control circuit, the containers being transported by a container transport system configured to transport the containers between the storage locations and at least one picking station, where one or more products are removed from one or more of the containers, and analyzing, by the control circuit, workload at the at least one picking station to determine whether the at least one picking station is available to accommodate the product merging between the at least two containers identified as being eligible for the product merging therebetween. The method further includes, upon an identification of the least two containers that are eligible for the product merging therebetween, and upon a determination that the at least one picking station is available to accommodate the product merging between the at least two containers identified by the control circuit as being eligible for the product merging therebetween, transmitting, by the control circuit, a first signal to a control unit operatively coupled to the container transport system and configured to control movement of the container transport system to cause the container transport system to remove the at least two containers identified as being eligible for the product merging therebetween from their storage locations in the storage structure, and to transport the at least two containers removed from their storage locations in the storage structure toward the at least one picking station determined to be available to accommodate the product merging between the at least two containers. The method further includes, upon detection that the at least two containers identified by the control circuit as being eligible for the product merging arrived at the at least one picking station determined to be available to accommodate the product merging between the at least two containers, transmitting, by the control circuit, a first signal to the control unit to cause the container transport system to keep the at least two containers that are eligible for the product merging at the at least one picking station until the product merging between the at least two containers is complete.

FIG. 1 shows an embodiment of an automated storage and retrieval system 100 for managing storage of inventory at a retail facility. The retail facility may be any entity operating as a brick-and-mortar physical location (e.g., a store, product distribution center, storage warehouse, etc.) and/or a website accessible via the internet by way of which products 190 may be purchased by a consumer. A consumer may be an individual or a business entity. Exemplary products 190 that may be ordered by the consumers from the retailer via the system 100 may include, but are not limited to, general-purpose consumer goods, as well as consumable products, such as grocery products and/or other food items, medications, and dietary supplements.

The exemplary automated storage and retrieval system 100 shown in FIG. 1 includes a storage structure 110 including a plurality of storage locations 112a-112e configured to store a plurality of containers (also referred to as totes) 120a-120, each containing one or more products 190. Notably, while the storage locations 112a-112e (e.g., storage shelves) have been shown in FIG. 1 as each storing one container 120a-120e thereon, it will be appreciated that each of the storage locations 112a-112e may store two or more storage containers 120 thereon.

In the exemplary system 100 of FIG. 1, the storage structure 110 is operatively coupled to a container transport system 125 configured to transport the containers 120a-120e in the directions indicated by the arrows in FIG. 1 to/from the storage locations 112a-e of the storage structure 110 and to/from at least one picking station 145, where one or more products 190 may be removed from one or more of the containers 120a-120e, for example, for picking products 190 to fulfill existing customer orders and/or for merging (i.e., consolidating) the products 190 between the containers 120a-120e to optimize the storing capacity of the storage containers 120a-120e. In some embodiments, the container transport system 125 comprises a conveying system including at least a main conveyor 130 configured to convey the containers 120a-120e in the directions indicated by the arrows in FIG. 1 to/from the storage locations 112a-e of the storage structure 110 and to/from at least one picking station 145. In some embodiments, the container transport system 125 can include non-conveyor-based mechanisms to transport the containers.

The exemplary automated storage and retrieval system 100 shown in FIG. 1 includes one generally U-shaped main conveyor 130, but it will be appreciated that the system 100 may include a differently-shaped main conveyor 130 and/or two or more main conveyors 130, depending on the size of the automated storage and retrieval system and/or the retail facility. By the same token, while the main conveyor 130 is illustrated in FIG. 1 as having 10 product storage containers 120d-120p thereon, it will be appreciated that the main conveyor 130, depending on its shape and size, may concurrently transport less storage containers 120 thereon, or significantly more storage containers 120 thereon. Further, while only the containers 120k and 120m are shown in FIG. 1 as having products 190 stored therein, it will be appreciated that each of the containers 120a-120q may contain any number (e.g., dozens and/or hundreds) of products 190 therein, depending on the size of the containers 120a-120q and the products 190. Further, the shape and size of the containers 120a-120q and the products 190 in FIG. 1 has been shown by way of example only, and it will be appreciated that the containers 120a-120q and the products 190 may have various shapes and sizes.

In the exemplary system 100 of FIG. 1, the main conveyor 130 (also referred to herein as "the conveyor 130") has a product advancement surface 132 configured to move one or more products containers 120a-120q in one or more directions indicated by the arrows. The product advancement surface 132 of the conveyor 130 may be comprised of a single conveyor belt surface, or may be instead comprised of a series of two or more independently movable conveyor belt surfaces (e.g., FIG. 1 shows a conveyor belt surface 132 having three independently movable conveyor below surfaces, with the direction of movement of each one of the independent conveyor belt surfaces being shown by a directional arrow.

In some aspects, one or more of the independently movable conveyor surfaces of the product advancement surface 132 of the conveyor 130 may be configured to stop, while one or more of the other independently movable conveyor sections of the product advancement surface 132 are permitted to move. The conveyor 130 may be a belt conveyor, chain conveyor, or the like, and may have a continuous, uninterrupted product advancement surface 132, or may have a product advancement surface 132 that includes one or more interruptions at the transitions between the distinct, independently movable conveyor surfaces.

The system 100 depicted in FIG. 1 includes a control unit 160 operatively coupled to the conveyor 130 and configured to control movement of the conveyor 130 via one or more control signals. In some aspects, the control unit 160 is configured to start or stop the movement of the conveyor 130 (or one or more independently movable product advancement surfaces 132 of the conveyor 130) in response to one or more control signals sent from an electronic inventory management device 150 (also referred to herein as a computing device) of the system 100, which will be described in more detail below.

The electronic inventory management device 150 of the exemplary system 100 may be located at the retail facility or remotely relative to the retail facility, and may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 150 is configured for data entry and processing as well as for communication with other devices of system 100 via the network 155. The exemplary network 155 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like.

In some embodiments, the system 100 includes one or more localized Internet-of-Things (IoT) devices and controllers in communication with the electronic inventory management device 150. As a result, in some embodiments, the localized IoT devices and controllers can perform most, if not all, of the computational load and associated monitoring that would otherwise be performed by the electronic inventory management device 150, and then later asynchronous uploading of summary data can be performed by a designated one of the IoT devices to the electronic inventory management device 150, or a server remote to the electronic inventory management device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the electronic inventory management device 150 or a server remote to the electronic inventory management device 150.

In the embodiment of FIG. 1, the system 100 further includes picking stations 145 (only one is shown in FIG. 1 for simplicity) configured to permit a robotic arm 147 or a human operator 185 (e.g., a human worker assigned to work at the automated storage and retrieval system 100) to pick one or more products 190 from one or more of the storage containers 120a-120q and to, for example, merge the products 190 picked from one of the storage containers (e.g., 120k) into another one of the storage containers (e.g., 120m) to optimize the storage space of the container 120m and to free up storage space of the container 120k.

Notably, in some embodiments, the picking station 145 may include a movable robotic arm 147 that is positioned and configured to grasp one or more of the products 190 from one or more of the containers 120k, 120m positioned at the picking station 145, and to transfer such products between the containers 120k, 120m positioned at the picking station 145. In certain implementations, the control unit 160 is configured to control the movement of the robotic arm 147 via one or more control signals. For example, the control unit 160 may control the start, stop, and direction of movement of the robotic arm 147 in response to one or more control signals sent from the electronic inventory management device 150. In some embodiment, the robotic arm 147 may not be controlled via the control unit 160, but may be operatively coupled to a separate control unit that is configured to control movement of the robotic arm 147 in response to one or more control signals sent from the electronic inventory management device 150.

Notably, in the system 100 of FIG. 1, the storage structure 110 includes a movable robotic arm 115 that is positioned to have access to the storage locations 112a-112e, and configured to grasp one or more of the containers 120a-120e positioned on the storage locations 112a-112e, and to transfer such containers 120a-120e from the storage structure 110 to the main conveyor 130. In certain implementations, the control unit 160 is configured to control the movement of the robotic arm 115 via one or more control signals. For example, the control unit 160 may control the start, stop, and direction of movement of the robotic arm 115 in response to one or more control signals sent from then electronic inventory management device 150. In some embodiment, the robotic arm 115 may not be controlled via the control unit 160, but may be operatively coupled to a separate control unit that is configured to control movement of the robotic arm 115 in response to one or more control signals sent from the electronic inventory management device 150.

In the exemplary system 100 depicted in FIG. 1, the picking station 145 includes one or more sensors 149 that are positioned and configured to detect each of the products 190 picked from, placed into, and/or otherwise transferred between the containers 120k, 120m by the operator 185 and/or by the robotic arm 147 at the picking station 145. One or more sensors 149 suitable for use to detect the number of products 190 picked from, placed into, and/or transferred between the containers 120k, 120m at the picking station 145 may include but is not limited to one or more of: a video camera, motion sensor, infrared sensor, bar code sensor, radio-frequency identification (RFID) sensor, laser sensor, or the like.

In the exemplary embodiment shown in FIG. 1, the picking station 145 includes a display 148 (which may be a stand-alone display or a computing device with a display (e.g., a laptop, tablet, or the like)). In some embodiments, the control circuit 210 of the electronic inventory management device 150 may send a signal to the display 148 to cause the display 148 to depict a visual and/or audible notification to the operator 185 at the at least one picking station 145. An exemplary notification that may be displayed on the display 148 in response to a signal sent by the control circuit 210 may include a notification identifying the two adjacent containers eligible for the product merging (e.g., 120k and 120m) and indicating which of the two adjacent containers (i.e., 120k or 120m) is to be emptied (by the operator 185 and/or robotic arm 147), and which of the two adjacent containers 120k, 120m is to be filled with the products 190 removed from the container 120k, 120m that is emptied. In some embodiments, instead of sending a notification to the operator 185 via the display 148, the control circuit 210 may send a signal including a container merging notification/instruction via the network 155 to a computing device (e.g., a hand-held phone, tablet, laptop, etc.) of the operator 185.

Figure 2:
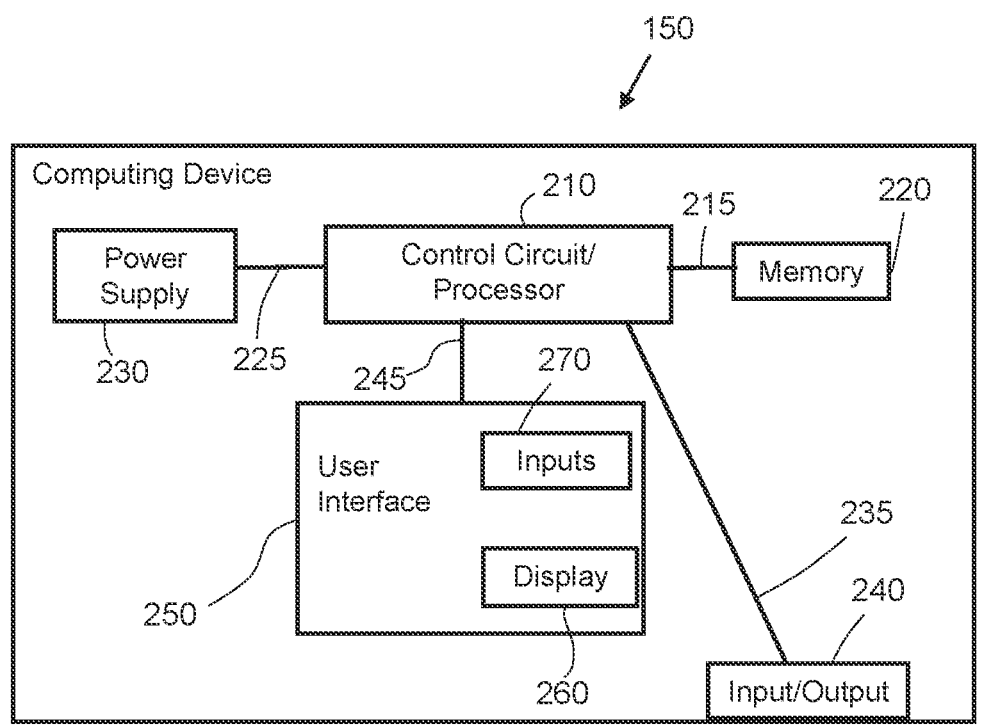
FIG. 2 is a functional diagram of a computing device in accordance with several embodiments.

With reference to FIG. 2, an exemplary electronic inventory management device 150 configured for use with exemplary systems and methods described herein may include a control circuit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit 210 may be referred to as a non-transitory medium or non-transitory computer readable medium.

The control circuit 210 of the electronic inventory management device 150 is also electrically coupled via a connection 235 to an input/output 240 that can receive signals from any of the other electronic components of the system 100 (e.g., control unit 160, sensor 149, electronic database 170), or from any other source (a regional central server, a hand-held device of a worker, etc.) that can communicate with the electronic inventory management device 150 via a wired or wireless connection. The input/output 240 can also send signals to the display 148, control unit 160, and electronic database 170 (shown in FIG. 1), or to any other device in wired or wireless communication with the electronic inventory management device 150.

In the embodiment shown in FIG. 2, the processor-based control circuit 210 of the electronic inventory management (or computing) device 150 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, set one or more product picking rules and/or container merging rules with respect to the containers 120a-120q and/or products 190 processed by the automated storage and retrieval system 100. It will be appreciated that the performance of such functions by the processor-based control circuit 210 of the electronic inventory management device 150 is not dependent on a human operator, and that the control circuit 210 may be programmed to perform such functions without a human operator.

In some embodiments, the display 260 of the electronic inventory management device 150 is configured to display various graphical interface-based menus, options, and/or alerts that may be transmitted from the electronic inventory management device 150 to, for example, the display 148, the control unit 160, or the like, in connection with various aspects of picking the products 190 from the containers 120a-120q and/or merging the products 190 between the containers 120a-120q. The inputs 270 of the electronic inventory management device 150 may be configured to permit an operator to navigate through the on-screen menus on the electronic inventory management device 150 and make changes and/or updates to, for example, the product merging business rules. It will be appreciated that the display screen 260 may be configured as both a display screen and an input 270 (e.g., a touch-screen that permits an operator to press on the display screen 260 to enter text and/or execute commands)

In some embodiments, while some of the product-containing containers (i.e., 120a-120a) are stored at storage locations 112a-112e of the storage structure 110, and while some of the containers 120f-120q are traveling on the conveyor 130, the control circuit 210 of the electronic inventory management device 150 is programmed to analyze at least one business rule governing product merging between the containers 120a-120e that are stored at the storage locations 112a-112e of the storage structure 110 to identify two or more containers (e.g., FIG. 1, containers 120k and 120m) that are eligible for the product merging therebetween. In addition, in certain implementations, the control circuit 210 of the electronic inventory management device 150 is programmed to analyze the containers (e.g., 120f-120j) being conveyed by the main conveyor 130 and workload (e.g., number of product picks assigned, number of product merging operations assigned, etc.) assigned to each of the picking stations 145 coupled to the main conveyor 130 to determine whether one (or more) of the picking stations 145 is (are) available to accommodate the product merging between the two or more containers (e.g., 120k, 120m) identified as being eligible for the product merging therebetween.

In certain aspects, the business rules governing the product merging between the containers 120a-120e stored at the storage locations 112a-112e of the storage structure 110 includes at least one of: a total number of the products 190 located within the containers 120a-120q conveyed by the conveying system 130; size dimensions of each of the products 190 located within the containers 120a-120e stored at the storage locations 112a-112e; a total weight of each of the products 190 located within the containers 120a-120e stored at the storage locations 112a-112e; pending customer orders associated with the products 190 located within the containers 120a-120e stored at the storage locations 112a-112e; categories of similar products that may be stored together in a container/tote and categories of dissimilar products that should not be stored in a container/tote together (i.e., one of the decision points for the control circuit 210 is to identify similar products 190 that may be stored together within a container/tote); a total number of product transfers required to merge the products 190 stored in two or more containers identified by the control circuit 210 as being eligible for the product transfer therebetween; and a total workload (e.g., total number of product pick operations, product merging operations, etc.) assigned to each one of the picking stations 145.

In the embodiment shown in FIG. 1, the electronic inventory management device 150 is coupled to and obtains the above-described business rules from an inventory management database 170 (also referred to herein simply as "the electronic database 170"). The electronic inventory management device 150 and the electronic inventory management database 170 may be implemented as a single device or may be implemented as two separate devices as illustrated in FIG. 1, and may be located at the same location/facility or at different locations/facilities. The electronic database 170 may be stored, for example, on non-volatile storage media (e.g., a hard drive, flash drive, or removable optical disk) internal or external to the electronic inventory management device 150, or internal or external to computing devices separate and distinct from the electronic inventory management device 150. In some embodiments, the electronic inventory management database 170 may be cloud-based.

In some embodiments, the exemplary electronic inventory management database 170 of FIG. 1 is configured to store electronic data associated with the products 190 stored in the containers 120a-120q stored and or transported by the automated storage and retrieval system 100. In certain aspects, the electronic inventory management database 170 may store electronic data indicating one or more of: an identifier and physical location of each of the containers 120a-120q, identifiers of each of the products 190 stored in each of the containers 120a-120q; estimated container/tote utilization value (which may be expressed, for example, as a percentage representing the occupied and/or available storage space for products 190 inside of each of the containers 120a-120q at a given time; association between the products 190 located within the containers 120a-120q that are associated with product orders placed by one or more customers of the retailer (and an indication of the number of units of each product 190 associated with each of the product orders); names and addresses of the customers of the retailer who ordered the products 190 for delivery/pickup. In one aspect, the electronic data representing the available storage space within each of the containers 120a-120q may be in the form of a grid-like map or planogram. In some aspects, the electronic inventory management database 170 is configured to facilitate real-time tracking of the inventory of available storage space inside of the containers 120a-120q and for real-time tracking of the inventory of products 190 controlled by the automated storage and retrieval system 100.

Figure 3:
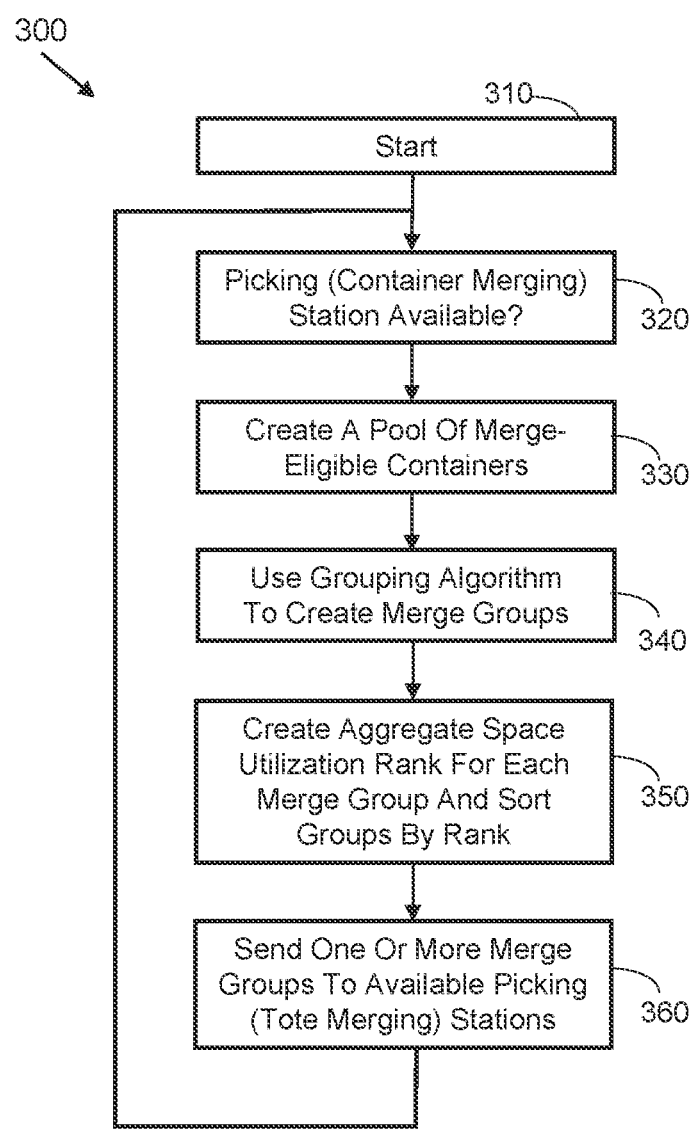
FIG. 3 is a flow chart diagram of a process of automated product storage, product retrieval, and storage space utilization at a product distribution facility in accordance with some embodiments.

An exemplary (so-called on-demand) tote-merging analysis by the control circuit 210 of the electronic inventory management device 150 is represented by a flow chart-organized process 300 shown in FIG. 3. In some embodiments, as the containers 120f-120q move on the conveyor 130 toward the picking station 145, the control circuit 210 is programmed to obtain data from the electronic inventory management database 170 and analyze the obtained data to determine which of the containers 120a-120e that are currently stored at storage locations 112a-112e of the storage structure 110 are eligible for product merging based on the applicable business rules preprogrammed into the control circuit 210.

Figure 5:
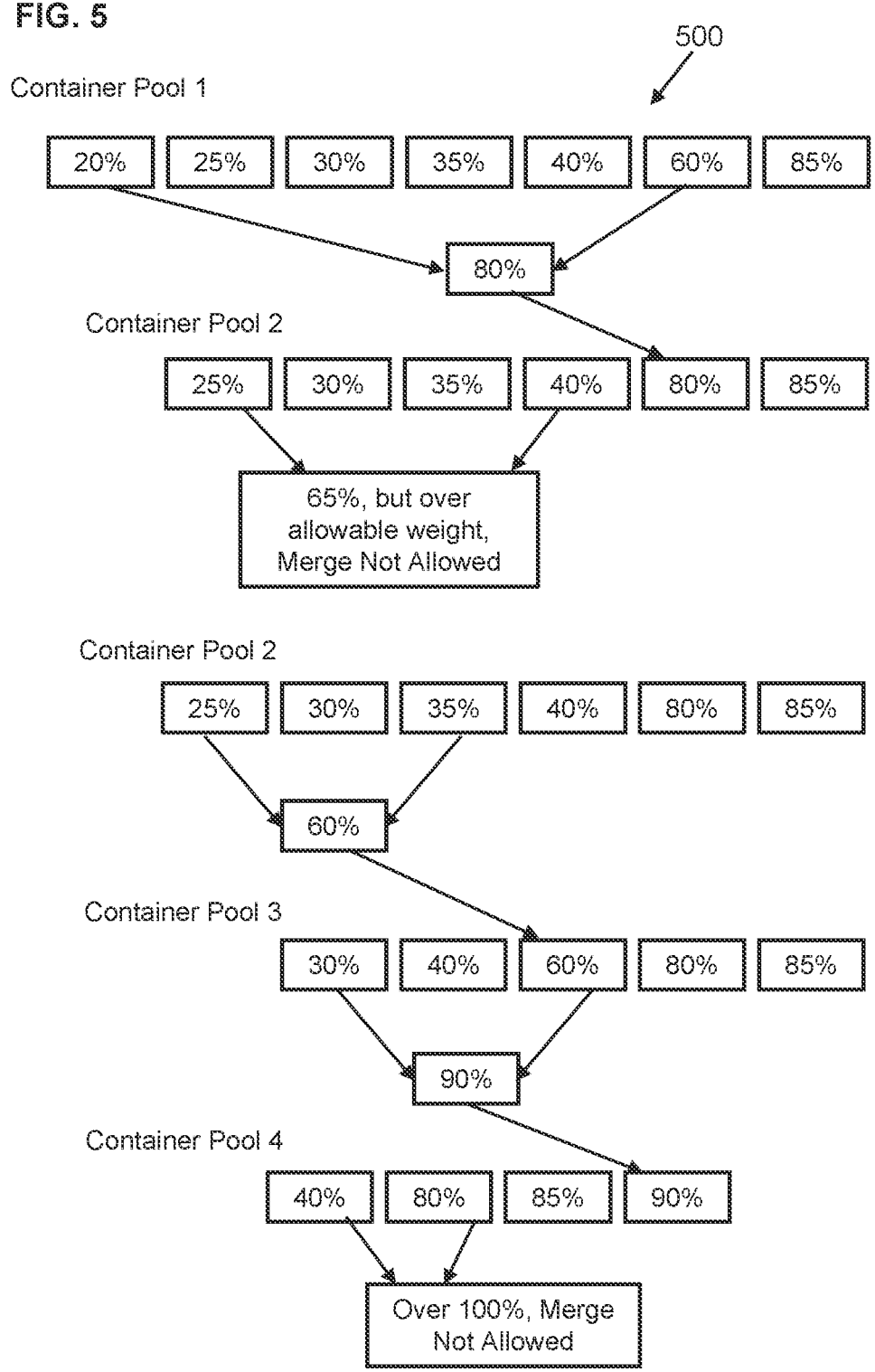
FIG. 5 is a flow diagram of a process of grouping containers to optimize storage space utilization at a product distribution facility in accordance with some embodiments.

For example, in the embodiment shown in FIG. 3, at the start of the process 300 the control circuit 210 first determines, based on an analysis of the current workload of the conveyor 130 and the current workload of the picking stations 145 (step 310), whether one or more picking stations 145 of the system 100 is available (i.e., can accommodate) a product merging operation of the containers 120a-120e that are not currently traveling on the conveyor 130, but are stored at storage locations 112a-112e of the storage structure 110 (step 320). If the control circuit 210 determines that a picking station 145 is available for the product merging between the containers 120a-120e stored at the storage structure 110, the control circuit 210 is programmed to analyze the containers 120a-120e in view of the applicable business rules to create a pool of containers 120a-120e that are at less than 100% space utilization and that are merge-eligible (step 330). An exemplary merge-eligible pool of containers is shown in FIG. 5 (see Container Pool 1).

After the control circuit 210 creates one or more pools of merge-eligible containers, the control circuit 210 is programmed to apply a container grouping algorithm (which will be described in more detail below with reference to FIGS. 4 and 5) to create container merge groups within the merge-eligible container pool (step 340). In some aspects, the analysis performed by the control circuit 210 in step 340 may include obtaining data from the electronic database 170 indicating the total number of different stock keeping units (SKUs) located in each of the containers (e.g., 120a-120e) in the merge-eligible container pool, the total quantity of products 190 stored in each of the containers 120a-120e, the dimensions of each of the products 190 stored in each of the containers 120a-120e, the weight of each of the products 190 stored in each of the containers 120a-120e, and the overall dimensions (e.g., length, width, height) of each of the containers 120a-120e.

In the embodiment illustrated in FIG. 3, after the control circuit 210 creates, based on the container merging/grouping algorithm/business rules, one or more container merge groups, the control circuit 210 is programmed to analyze each of the container merge groups to create an aggregate rank for each of the container merge groups based on the space utilization achieved within each of the container merge groups by the container grouping/merging algorithm applied by the control circuit 210 (step 350). Here, a container merge group that achieves the highest possible space utilization for the products 190 stored within the containers of the merge group after the merging operation determined by the control circuit 210 would have the highest ranking, and a container merge group that achieves the lowest possible space utilization for the products 190 stored within the containers of the merge group after the merging operation determined by the control circuit 210 would have the lowest ranking. After the aggregate space utilization ranking is determined by the control circuit 210 for each of the merge groups created by the control circuit 210, the next step of the exemplary process 300 involves the control circuit causing the containers of the highest ranked merge groups to be removed from the storage structure 110 and conveyed via the conveyor 130 to an available picking station 145 for product merging therebetween according to the grouping algorithm determined by the control circuit 210.

Figure 4:
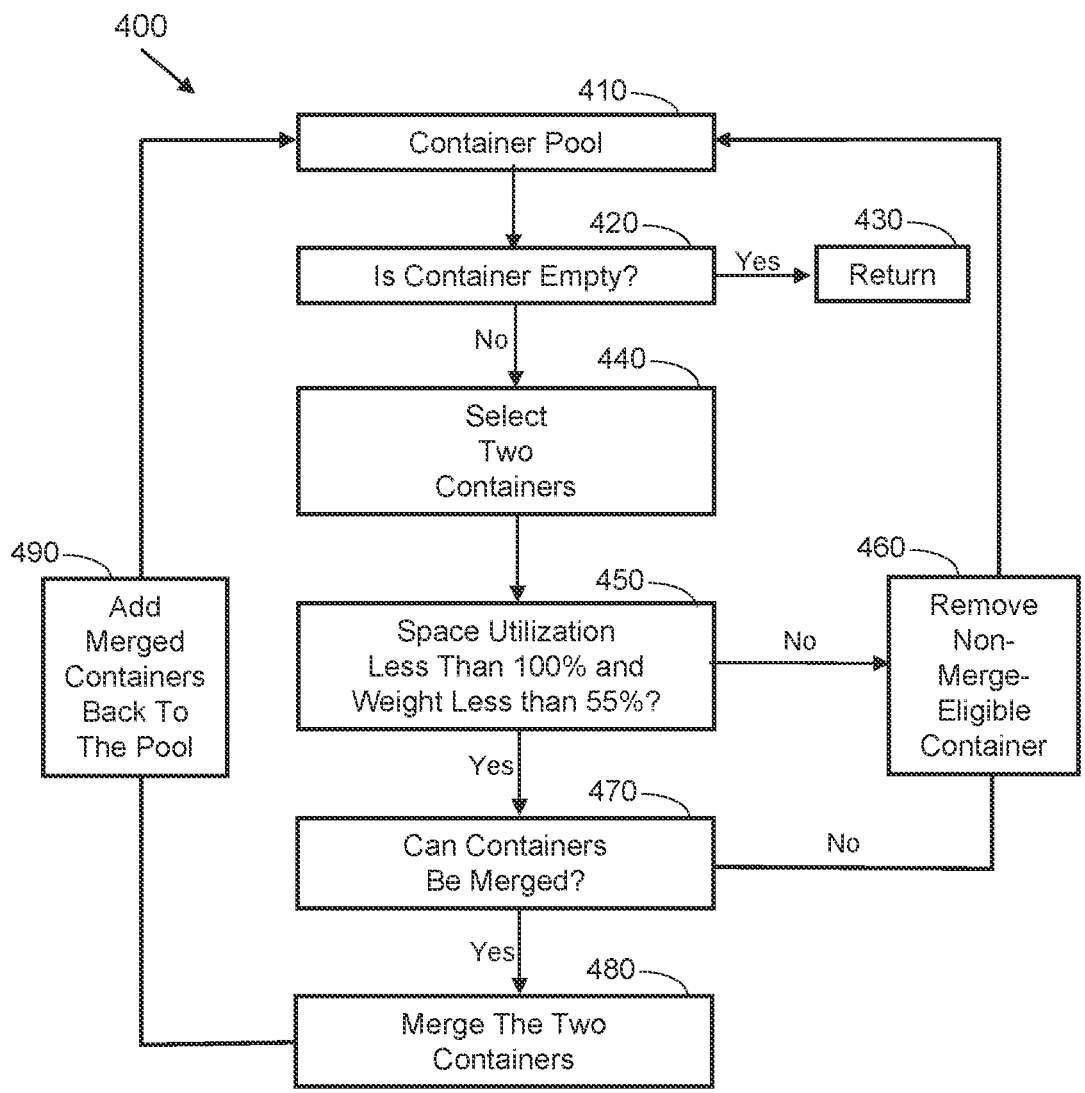
FIG. 4 is a flow diagram of a process of automated product storage, product retrieval, and storage space utilization at a product distribution facility in accordance with some embodiments.

An exemplary container grouping algorithm utilized by the control circuit 210 in an exemplary embodiment is depicted by way of a flow process 400 in FIG. 4. In the flow process 400, after the control circuit 210 identifies a pool of containers 120a-120e that are merge-eligible (step 410), the control circuit determines whether any of the containers 120a-120e in the merge-eligible pool are empty (step 420). In the illustrated embodiment, if the control circuit 210 determines that the merge-eligible pool of containers 120a-120e contains an empty container (which does not have any products 190 stored therein to merge into another container), the control circuit 210 removes such a container from the merge-eligible container pool (step 430).

In the embodiment illustrated in FIG. 4, after identifying and selecting two containers (e.g., 120k, 120m) that are not empty for product merging (step 440), the control circuit 210 is programmed to determine (e.g., by obtaining relevant information from the electronic database 170) whether the containers 120k, 120m of the selected merge-eligible container pair are not fully filled up (i.e., have a space utilization of less than 100%), and whether the weight of the products 190 stored in the containers 120k, 120m amounts to 55% of the total product weight permitted (e.g., by container manufacturer specifications) to be loaded into the containers 120k, 120m (step 450). If the answer in step 450 is "No" with respect to one or more of the containers in the merge-eligible pair, the control circuit 210 is programmed to remove such a container(s) from the merge-eligible container pool (step 460).

On the other hand, if the answer in step 450 is "Yes" with respect to both containers 120k, 120m in the merge-eligible pair, the control circuit 210 is programmed to keep such containers in the merge-eligible container pool, and determines, in view of the pre-programmed business rules described above, whether the two given containers can be merged to optimize their space utilization value (step 470). If the answer in step 470 is "Yes" with respect to both containers 120k, 120m in the merge-eligible pair, the control circuit 210 is programmed to transmit a signal to cause the container transport system 125 to merge the two containers 120k, 120m, and transmits a signal to the electronic database 170 to reflect that the two containers 120k, 120m have been merged (e.g., such that the container 120m is now empty and the container 120k is now further filled up with the products 190 transferred into the container 120k from the container 120m) (step 480). Notably, in the illustrated embodiment, after the containers 120k, 120m are merged for purposes of the flow process 400 in step 480, if the merged container 120k is determined by the control circuit 210 to be less than 100% filled up such that the container 120k may be subjected to further product merging, the control circuit 210 is programmed to add the merged container 120k back into the product merge-eligible container pool (step 490).

FIG. 5 shows, in the form of a flow process 500, an exemplary container grouping algorithm that may be implemented by the control circuit 210 in some embodiments. With reference to FIG. 5, Container Pool 1 represents a group of 7 containers stored at storage locations 112a-112e of the storage structure that are subject to the container merging analysis performed by the control circuit 210 in accordance with some embodiments. As can be seen in FIG. 5, the control circuit 210 has determined (e.g., based on obtaining relevant data from the electronic database 170) that each of the seven containers in Container Pool 1 has the following respective space utilization: 20%, 25%, 30%, 35%, 40%, 60%, and 85%. In the embodiment illustrated in FIG. 5, the control circuit 210 is programmed to determine which container in Container Pool 1 may be merged together with the container having the minimum space utilization (i.e., the 20% container). With reference to FIG. 5, the control circuit 210 would first determine that the 20% container may not be merged with the 85% container because merging these two containers would exceed the maximum (i.e., 100%) storage capacity of the 85% container (i.e., 85%+20%=105%). The control circuit 210 would next determine that it would be optimal to merge the 20% container with the next fullest container (i.e., the 60% container) without exceeding the maximum (i.e., 100%) storage capacity of the 60% container (i.e., 60%+20%=80%).

Notably, as pointed out with reference to step 490 in FIG. 4, the control circuit 210 is programmed to add the merged container (i.e., 80%) to the merge-eligible container pool, which is evidenced by the Container Pool 2 in FIG. 5, which no longer includes the fully emptied 20% container or the pre-merging 60% container, but now includes the merged 80% container. Since the control circuit 210 is programmed to determine which container in the Container Pool 2 may be merged together with the container having the minimum space utilization (i.e., the 25% full container), the control circuit 210 would eliminate the 80% and 85% full containers from being merged with the 25% container, since such a merging operation would exceed the 100% storage capacity of the merged container, thereby violating the applicable merging business rules. As such, generally speaking, the 40% container would then be analyzed by the control circuit 210 for possibly merging with the 25% container.

FIG. 5 shows that, in some scenarios, the control circuit 210 is programmed to reject product merging between certain container pairs based on the applicable container weight limit business rules, even if the product merging between such containers would not violate the business rule that restricts product merging resulting in a space utilization of more than 100% in the merged container. In particular, FIG. 5 shows that, while the control circuit 210 would generally select the 25% container and the 40% container for product merging in Container Pool 2 based on the applicable space utilization business rules, in this case, the combined weight of the products 190 within these two containers is determined by the control circuit 210 to exceed the maximum weight that is permitted to be stored within the merged container (e.g., in view of a container manufacturer's specification), and this product merge pairing is rejected by the control circuit 210.

FIG. 5 shows a scenario, where, after the control circuit 210 rejected the product merging between the 25% and 40% containers and eliminated the 40% container from the merge-eligible Container Pool 2, the control circuit 210 determines, based on an analysis of the applicable business rules (e.g., space utilization, total permissible weight, etc.) that the 35% container may be properly merged with the 25% container, thereby resulting in the emptying of the 25% container and the transformation of the 35% container into the merged 60% container. As a result, Container Pool 3 of FIG. 5 includes five containers, namely the original 30% container, the original 40% container, the merged 60% container, the merged 80% container, and the original 85% container.

Since in the illustrated embodiment the control circuit 210 is programmed to determine which container in the Container Pool 3 may be merged together with the container having the minimum space utilization (i.e., the 30% full container), the control circuit 210 would eliminate the 80% and 85% full containers from being merged with the 30% container, since such a merging operation would exceed the 100% storage capacity of the merged container, thereby violating the applicable merging business rules. In the process flow 500 shown in FIG. 5, the control circuit 210 determined, based on an analysis of the applicable business rules, that the 60% container is the next container that is merge-eligible with the 30% container, thereby creating the 90% full container.

As pointed out above, the control circuit 210 then adds the merged 90% container to the merge-eligible container pool, thereby creating Container Pool 4 including four containers, namely the original 40% container, the merged 80% container, the original 85% container, and the merged 90% container. Notably, the control circuit 210 is programmed to remove all of the containers from the Container Pool 4, since none of the four containers in Container Pool 4 may be merged with one another without exceeding 100% container capacity. Nonetheless, as a result of the container merging operations depicted in FIG. 5, where the product merging by the control unit 210 significantly increased storage space utilization by eliminating three of the original seven containers of Container Pool 1 from the storage structure 110, and by utilizing more space in the four containers that remain (i.e., Container Pool 4) after the product merging operation.

With reference back to FIG. 1, and as mentioned above, in some aspects, after analyzing the number and size of the products 190 stored in the containers 120a-120e (which have known dimensions stored in the electronic inventory management database 170), the control circuit 210 is programmed to apply one or more business rules that govern merging between the containers 120a-120e stored at the storage structure 110 to determine (and flag for merging in the electronic database 170) a group of containers (in the example of FIG. 1, containers 120k, 120m) that can be transported from the storage structure to a picking station 145 to have products 190 merged therebetween according to the exemplary algorithm described above to improve the space utilization between the merged containers.

In certain implementations, after the control circuit 210 of the electronic inventory management device 150 analyzes the above-described business rules governing product merging between the containers 120a-120e stored in the storage locations 112a-112e of the storage structure, when the control circuit 210 detects (e.g., by receiving a signal from one or more sensors 149 located at the one or more picking stations 145) that two containers (e.g., 120k and 1200m) of a merge-eligible group have been transported from the storage structure 110 to the picking station 145, the control circuit 210 transmits a first signal to the control unit 160 to cause the container transport system 125 to keep the two merge-eligible containers 120k, 120m at the picking station 145 for a period of time that is sufficient to permit the operator 185 or the robotic arm 147 to remove all of the products 190 stored in one of the two adjacent containers (e.g., 120k) and place the removed products 190 into the other one of the two adjacent containers (i.e., 120m) to be merged with the products 190 stored in the container 120m.

In the embodiment shown in FIG. 1, the container transport system 125 includes a main conveyor 130 and a transfer conveyor 135. In some implementations, the transfer conveyor 135 is configured for movement in a direction perpendicular to at least one product advancement surface 132 of the main conveyor 130. It will be appreciated that the transfer conveyor 135 may be oriented in a direction that is not perpendicular (e.g., at a 30 degree angle, 45 degree angle, 60 degree angle, etc.) relative to product advancement surface 132.

In some embodiments, when the containers (e.g., 120k, 120m) stored in the storage structure 110 that have been identified by the control circuit 210 based on the above-described analysis as being a part of a container pool that is eligible for the product merging arrive on the product advancement surface 132 of the main conveyor 130 at the picking station 145, one of the sensors 149 located at the picking station 145 sends a signal via the network 155 to the electronic inventory management device 150 to indicate that the sensor 149 detected the arrival of the containers 120k, 120m at the picking station 145. In one aspect, each of the containers moving on the conveyor 130 includes an identifier (e.g., bar code, RFID, etc.) configured to be scanned and recognized by one or more of the sensors 149.

In one embodiment, in response to receiving a signal from the sensor 149 indicating that the containers 120k, 120m marked/flagged by the control circuit 210 for the product merging based on the above-discussed analysis arrived at the picking station 145, the control circuit 210 of the electronic inventory management device 150 sends a signal to the control unit 160 to activate the movement of the transfer conveyor 135 such that the containers 120k, 120m are transferred from the product advancement surface 132 of the conveyor 130 into the product picking area of the picking station 145, where the operator 185 (or the robotic arm 147) may pick one or more products 190 from one or more of the containers 120k, 120m, depending on the instructions sent by the control circuit 210 (which may be displayed to the operator 185 on the display 148). In another embodiment, in response to receiving a signal from the sensor 149 indicating that the containers 120k, 120m marked/flagged by the control circuit 210 for product merging arrived at the picking station 145, instead of sending a signal to the control unit 160 to activate the transfer conveyor 135, the control circuit 210 of the electronic inventory management device 150 sends a signal to the control unit 160 to activate the movement of the robotic arm 147 to grasp and transfer the containers 120k, 120m from the product advancement surface 132 of the conveyor 130 into the product picking area of the picking station 145.

Notably, it is not necessary for the containers 120k, 120m flagged for product merging therebetween to be moved off (e.g., by the operator 185 or the robotic arm 147) the product advancement surface 132 of the conveyor 130 when the containers 120, 120m are detected by one or more sensors 149 as having arrived at the picking station 145. In some embodiments, in response to receiving a signal from the sensor 149 indicating that the containers 120k, 120m flagged by the control circuit 210 for the product merging based on the above-discussed analysis arrived at the picking station 145, the control circuit 210 of the electronic inventory management device 150 sends a signal to the control unit 160 to stop the movement of the main conveyor 130 such that the containers 120k, 120m are stopped at the picking station 145, but remain on the product advancement surface 132 of the conveyor 130, such that the operator 185 (or the robotic arm 147) may pick one or more products 190 from one or more of the containers 120k, 120m while the containers 120k, 120m are positioned on the product advancement surface 132.

In one embodiment, in response to receiving a signal from the sensor 149 indicating that the containers 120k, 120m marked/flagged by the control circuit 210 for product merging based on the above-discussed analysis arrived at the picking station 145, the control circuit 210 of the electronic inventory management device 150 sends a signal to the control unit 160 to activate the movement of the transfer conveyor 135 such that the containers 120k, 120m are transferred from the product advancement surface 132 of the conveyor 130 into the product picking area of the picking station 145, where the operator 185 (or the robotic arm 147) may pick one or more products 190 from one or more of the containers 120k, 120m, depending on the instructions sent by the control circuit 210 (which may be displayed to the operator 185 on the display 148).

In some embodiments, after all of the products 190 are picked from the first one of the containers (e.g., 120k) located at the picking station 145 and transferred into the second one of the containers (i.e., 120m) located at the at least one picking station, the transfer conveyor 135 is activated (e.g., via a signal sent by the control circuit 210 to the control unit 160) to convey the (now empty) first container 120k from the picking station 145 (directly, or partially via the product advancement surface 132 of the main conveyor 130) to an empty container filling station or disposal station. In one aspect, if the merging of the products 190 from the container 120k into the container 120m causes the container 120m to be completely full (i.e., achieve a 100% space utilization), the main conveyor 130 is activated (e.g., via a signal sent by the control circuit 210 to the control unit 160) to convey the (now full) second container 120m from the picking station 145 via the transfer conveyor 135 and the product advancement surface 132 of the main conveyor 130 to the storage structure 110 to be stored at one of the product storage locations 112a-112e.

In another aspect, if the merging of the products 190 from the container 120k into the container 120m causes the container 120m to be less than completely full (e.g., achieve a 66% space utilization), after the now empty container 120k is moved from the picking station 145 (via the transfer conveyor 135 and/or the main conveyor 130) to an empty container filling station or disposal station, the control circuit 210 is programmed to analyze the other containers stored in the storage structure 110 and determined by the control circuit 210 to be a part of a merge-eligible container pool having the highest space utilization ranking to possibly identify another (i.e., a third) and/or another (e.g., a fourth) container that is eligible to participate in the product merging process with the container 120m that remains at the picking station 145.

For example, if the control circuit 210 analyzes the space utilization value of the containers 120a-120e stored in the storage structure 110 in view of the above-described container merging algorithm and applicable product merging business rules, and determines that container 120a is eligible for product merging with the container 120m that remains at the picking station 145 because the number of products 190 stored in the container 120a, if merged with the products 190 stored in the container 120m, would fill the container 120m to a 100% space utilization, the control circuit 210 may transmit a third signal to the control unit 160 to activate the main conveyor 130 to convey the third container 120a to the picking station 145 for the product merging with the second container 120m that remains at the picking station 145 after the first (emptied) container 120k has been moved out from the picking station 145.

In some embodiments, after the determination by the control circuit 210 that the second container 120m has been filled with the products 190 such that the second container 120m is no longer eligible for the product merging with another one of the containers 120a-120e that are stored in the storage structure 110 (either because the container 120m is at 100% space utilization, or because the other containers stored in the storage structure 110 are otherwise incompatible for product merging with the container 120m), the control circuit 210 is programmed to transmit a signal to the control unit 160 to activate the transfer conveyor 135 and/or the main conveyor 130 to convey the optimally filled second container 120m from the picking station 145 to the storage structure 110 to open up space at the picking station 145 for a pair of containers of another merge-eligible container pair that has been identified (based on the above-described business rules) by the control circuit 210.

Figure 6:
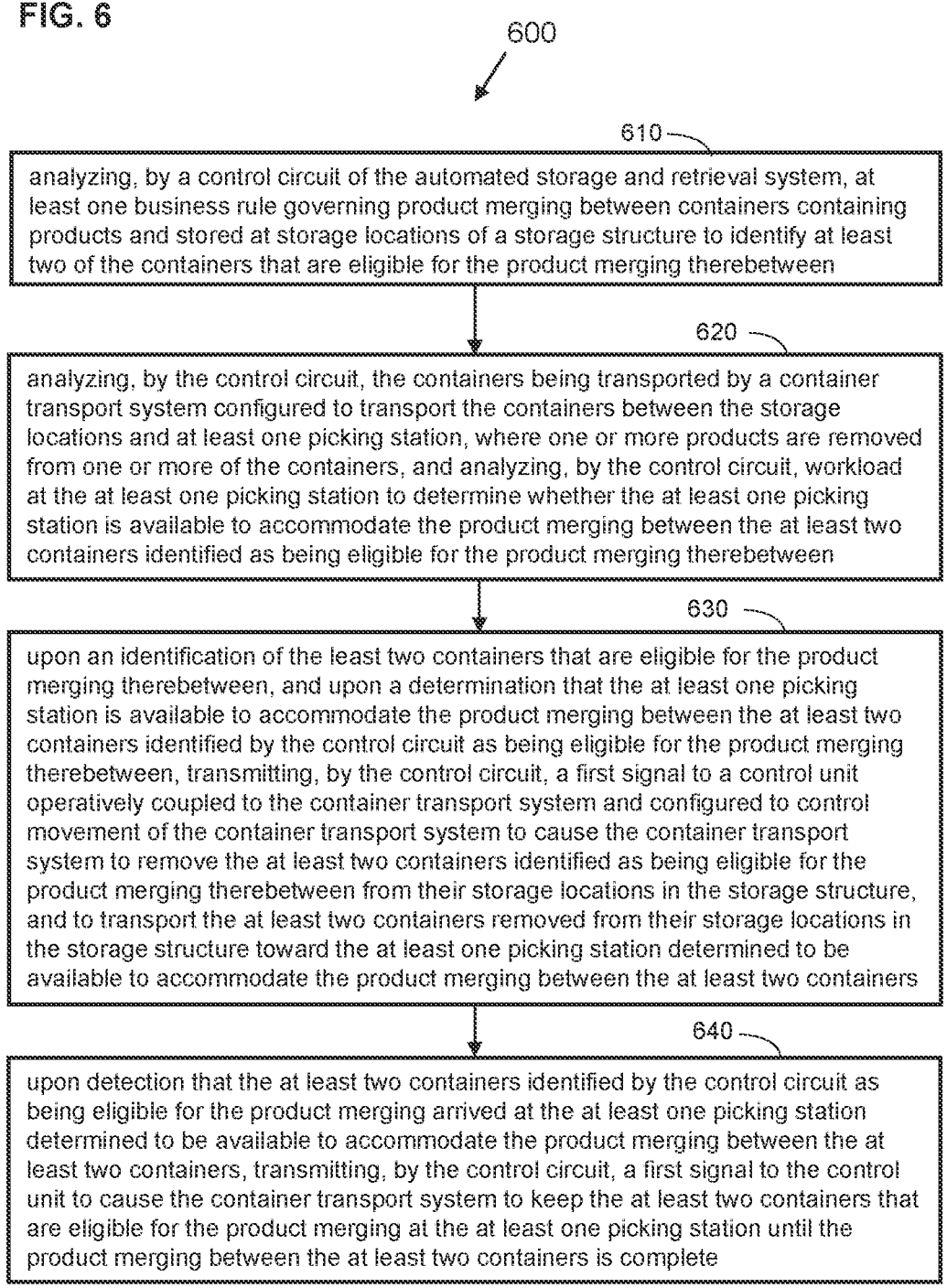
FIG. 6 is a flow diagram of a process of automated product storage, product retrieval, and storage space utilization at a product distribution facility in accordance with some embodiments.

FIG. 6 shows an embodiment of a method 600 of using an automated storage and retrieval system 100 for managing storage of inventory at a retail facility. With reference to FIGS. 1 and 6, the exemplary method 400 includes analyzing, by a control circuit 210 of the electronic inventory management device 150 of the automated storage and retrieval system 100, one or more business rules governing product merging between the containers 120a-120e that contain a plurality of products 190 and which are stored at storage locations 112a-112e of the storage structure 110, toward one or more product picking stations 145 to identify a group of two or more containers (e.g., 120k, 120m) that are eligible for product merging therebetween (step 610). In addition, the method 600 includes analyzing, by the control circuit 210, the containers 120f-120q being transported by a container transport system 125 configured to transport the containers 120f-120q between the storage locations 110a-110e and one or more picking stations 145, as well as analyzing, by the control circuit 210, the workload at the one or more picking stations 145 to determine whether one or more picking stations 145 is/are available to accommodate the product merging between the two or more containers identified by the control circuit 210 as being eligible for the product merging therebetween (step 620).

As mentioned above, the storage locations 112a-112e of the storage structure 110 can store one or more of the containers 120a-120e thereon. Notably, the containers 120a-120e may be transferred from the storage locations 112a-112e to the container transport system 125 and from the container transport system 125 onto the storage locations 112a-112e by a human operator or by a robotic arm 115, as depicted in FIG. 1. Notably, as described above, the container transporting system 125 of the exemplary automated storage and retrieval system 100 may include a main conveyor 130 configured to convey the merge-eligible containers 120a-120e between the storage locations 112a-112e of the storage structure 110 and the picking station 145, where the products 190 are removed (for order fulfillment or for container merging) from one or more of the merge-eligible containers. As described above, in some embodiments, a control unit 160 is operatively coupled to the main conveyor 130 (and/or the transfer conveyor 135) of the container transporting system 125, and this control unit 160 is configured to control the movement of the main conveyor 130 (and/or the transfer conveyor 135), for example, in response to receiving control signals from the control circuit 210 of the electronic inventory management device 150.

With reference to FIG. 6, after the control circuit 210 identifies two or more containers (e.g., 120k, 120m) stored in the storage structure 110 that are eligible for product merging therebetween, and after the control circuit 210 detects (e.g., by receiving a signal from a sensor 149) that the two merge-eligible containers 120k, 120m arrived at the picking station 145, the exemplary method 600 further includes transmitting, by the control circuit 210, a first signal to the control unit 160 of the container transport system 125 to cause the container transport system 125 to remove (e.g., via the robotic arm 115) the containers 120k, 120m from the storage structure 110, and to transport the containers 120k, 120m toward the picking station 145 of the container transport system 125 that was determined by the control circuit 210 to be available for the container merging (step 630). As noted above, the containers 120k, 120m flagged for product merging by the control circuit 210 may be transferred from the product advancement surface 132 of the main conveyor 130 into a product picking area of the picking station 145 via a transfer conveyor 135, or via a robotic arm 147 positioned at the picking station 145.

With reference to FIG. 6, after the control circuit 210 identifies the containers (e.g., 120k, 120m) of the merge-eligible group, and after the control circuit 210 detects (e.g., by receiving a signal from a sensor 149) that the containers 120k, 120m of the merge-eligible group arrived at the picking station 145, the exemplary method 600 further includes transmitting, by the control circuit 210, a first signal to the control unit 160 of the container transport system 125 to cause the container transport system 125 to keep the containers 120k, 120m of the merge-eligible group at the picking station 145 until all of the products 190 stored in a first one of the two adjacent containers 120k are removed from the container 120k and merged with the products 190 stored in the second one of the two adjacent containers 120m (step 640).

Then, after the merging operation is complete as indicated by one or more sensors 149 (which detect every pick and transfer of the products 190 between the containers 120k, 120m), the control circuit 210 of the electronic inventory management device is programmed to cause the conveying system to move the emptied out container 120k to an empty container filling or disposal area, and to move the fully filled up container 120m to the storage structure 110 to be stored at one of the storage locations 112a-112e. As pointed out above, in some implementations, if the control circuit 210 determines that the container 120m is not fully filled up with the products 190 after the product merging operation, and that another (i.e., third) container (e.g., 120a) stored in the storage structure 110 if emptied of products 190, would fully fill up the container 120m, the control circuit 210 is programmed to cause the container transport system 125 to move this third container 120a into the empty space at the picking station 145 left by the moved out container 120k, and to send a signal to cause the robotic arm 147 to perform the product merging between the container 120m and the third container 120a, or to send a signal to the display 148 to instruct the operator 185 to perform the product merging between the container 120m and the third container 120a.

The systems and methods described herein advantageously allow retail facilities to automatically merge products between storage containers to optimize storage space utilization of the storage containers without requiring the workers to visually inspect the storage containers and to manually determine which containers to merge and how many products can be transferred from one container to another. The systems and methods describe herein thus provide significant operation efficiency and operation cost reduction for the retailers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An automated storage and retrieval system for managing storage of inventory at a retail facility, the system comprising:
    a storage structure including a plurality of storage locations configured to store a plurality of containers, each of the containers containing a plurality of products;
    a container transport system including at least one conveyor configured to transport the containers between the storage locations and at least one picking station, where one or more products are removed from one or more of the containers;
    a control unit operatively coupled to the container transport system and configured to control movement of the at least one conveyor of the container transport system; and
    a control circuit communicatively coupled to the control unit, wherein:
        the control circuit identifies at least two containers that are eligible for product merging therebetween;
        the control circuit determines whether the at least one picking station is available to accommodate the product merging between the at least two containers identified as being eligible for the product merging therebetween;
        upon an identification by the control circuit of the at least two containers that are eligible for the product merging therebetween and upon a determination that the at least one picking station is available to accommodate the product merging between the at least two containers identified as being eligible for the product merging therebetween, the control circuit transmits a first signal to the control unit to cause the control unit to cause the container transport system to transport the at least two containers removed from their respective storage locations in the storage structure on the at least one conveyor of the container transport system toward the at least one picking station determined to be available to accommodate the product merging between the at least two containers; and
        in response to receipt, by the control circuit, of a second signal indicating that the at least two containers identified as being eligible for the product merging arrived at the at least one picking station determined to be available to accommodate the product merging between the at least two containers, the control circuit transmits a third signal to the control unit that controls the movement of the at least one conveyor of the container transport system to cause the at least two containers that are eligible for the product merging to stop and remain at the at least one picking station until the product merging between the at least two containers is complete.

2. The system of claim 1, wherein the control circuit is configured to identify the at least two containers that are eligible for the product merging based on at least one of: a total number of the products located within the containers stored at the storage locations in the storage structure; size dimensions of each of the products located within the containers stored at the storage locations in the storage structure; a total weight of each of the products located within the containers stored at the storage locations in the storage structure; pending customer orders associated with the products located within the containers stored at the storage locations in the storage structure; a total number of product transfers required to merge the products between the at least two containers identified as being eligible for the product merging; and a total workload assigned to the at least one picking station.

3. The system of claim 1, wherein the control circuit is further configured, upon the identification by the control circuit of the at least two containers identified as being eligible for the product merging, to transmit a third signal to a computing device including a display to cause the computing device to show on the display a notification to a worker at the at least one picking station, the notification identifying the at least two containers identified as being eligible for the product merging and indicating which of the at least two containers is to be emptied, and which of the at least two containers is to be filled with the products removed from one or more containers that are emptied.

4. The system of claim 1, wherein the control circuit is further configured to:
identify a plurality of groups of the containers that are eligible for the product merging therebetween;
determine a space utilization value for each of the containers in each of the groups, the space utilization value being based on a product fill level percentage of each of the containers;
generate a ranking of the groups, the ranking listing the groups in an order from a highest combined group space utilization value to a lowest combined group space utilization value; and
transmit a third signal to the control unit to cause the at least one conveyor of the container transport system to transport the containers of the group ranked as having the highest combined group space utilization value from the storage structure toward the at least one picking station for the product merging.

5. The system of claim 4, wherein the control circuit is further configured to determine that the at least two containers are eligible for the product merging if:
each of the at least two containers eligible for the product merging has a space utilization value of less than 100%;
the product merging does not result in a space utilization value that exceeds 100% for a first one of the at least two containers eligible for the product merging that is being filled with the products removed from one or more of another of the at least two containers eligible for the product merging; and
a combined weight of the products in the first one of the at least two containers does not exceed a maximum weight permitted by the first one of the at least two containers.

6. The system of claim 5, wherein the control circuit is configured to select, for an initial product merging in a group of the containers that are eligible for the product merging therebetween, a container having a highest space utilization value and a container having a lowest space utilization value.

7. The system of claim 4, wherein after the product merging between two containers of a group of product merging eligible containers at the at least one picking station, the control circuit is further configured to determine that one of the containers in the group of the containers is not eligible for further product merging and to remove the one of the containers from the product merging eligible group.

8. The system of claim 7, wherein the container transport system further includes:
a main conveyor configured to convey the containers between the storage locations and the at least one picking station; and
a transfer conveyor configured to convey the one of the containers, determined by the control circuit to be not eligible for further product merging and removed from the product merging eligible group, from the at least one picking station to one of the storage structure, an empty container processing station.

9. The system of claim 1, wherein the container transport system includes at least one sensor configured to detect a number of the products picked from at least a first one of the at least two containers at the at least one picking station and transferred into a second one of the at least two containers at the at least one picking station.

10. The system of claim 1, wherein the at least one picking station includes at least one robotic arm and the control unit of the container transport system is configured to control the at least one robotic arm to perform the product merging between the containers at the at least one picking station; and wherein the control circuit is configured to transmit a third signal to the control unit of the container transport system to control movement of the at least one robotic arm.

11. A method of using an automated storage and retrieval system for managing storage of inventory at a retail facility, the method comprising:
identifying, by a control circuit of the automated storage and retrieval system, at least two of the containers that are eligible for product merging therebetween;
determining, by the control circuit, whether at least one picking station is available to accommodate the product merging between the at least two containers identified as being eligible for the product merging therebetween;
upon an identification by the control circuit of the at least two containers that are eligible for the product merging therebetween, and upon a determination that the at least one picking station is available to accommodate the product merging between the at least two containers identified by the control circuit as being eligible for the product merging therebetween, transmitting, by the control circuit, a first signal to a control unit operatively coupled to a container transport system including at least one conveyor, the control unit configured to control movement of the at least one conveyor of the container transport system, the first signal causing the container transport system to transport the at least two containers removed from their respective storage locations in the storage structure on the at least one conveyor of the container transport system toward the at least one picking station determined to be available to accommodate the product merging between the at least two containers; and in response to receipt, by the control circuit, of a second signal indicating that the at least two containers identified by the control circuit as being eligible for the product merging arrived at the at least one picking station determined to be available to accommodate the product merging between the at least two containers, transmitting, by the control circuit, a third signal to the control unit that controls the movement of the at least one conveyor of the container transport system to cause the at least two containers that are eligible for the product merging to stop and remain at the at least one picking station until the product merging between the at least two containers is complete.

12. The method of claim 11, wherein the identifying, by the control circuit of the automated storage and retrieval system, the two adjacent containers that are eligible for product merging therebetween is based on at least one of: a total number of the products located within the containers stored at the storage locations in the storage structure; size dimensions of each of the products located within the containers stored at the storage locations in the storage structure; a total weight of each of the products located within the containers stored at the storage locations in the storage structure; pending customer orders associated with the products located within the containers stored at the storage locations in the storage structure; a total number of product transfers required to merge the products between the at least two containers identified as being eligible for the product merging; and a total workload assigned to the at least one picking station.

13. The method of claim 11, further comprising, upon the identification by the control circuit of the at least two containers identified as being eligible for the product merging, transmitting, by the control circuit, a third signal to a computing device including a display to cause the computing device to show on the display a notification to a worker at the at least one picking station, the notification identifying the at least two containers identified as being eligible for the product merging and indicating which of the at least two containers is to be emptied, and which of the at least two containers is to be filled with the products removed from one or more containers that are emptied.

14. The method of claim 11, further comprising, by the control circuit:
identifying a plurality of groups of the containers that are eligible for the product merging therebetween;
determining a space utilization value for each of the containers in each of the groups, the space utilization value being based on a product fill level percentage of each of the containers;
generating a ranking of the groups, the ranking listing the groups in an order from a highest combined group space utilization value to a lowest combined group space utilization value; and
transmitting a third signal to the control unit to cause the at least one conveyor of the container transport system to transport the containers of the group ranked as having the highest combined group space utilization value from the storage structure toward the at least one picking station for the product merging.

15. The method of claim 14, further comprising determining by the control circuit that the at least two containers are eligible for the product merging if:
each of the at least two containers eligible for the product merging has a space utilization value of less than 100%;
the product merging does not result in a space utilization value that exceeds 100% for a first one of the at least two containers eligible for the product merging that is being filled with the products removed from one or more of another of the at least two containers eligible for the product merging; and
a combined weight of the products in the first one of the at least two containers does not exceed a maximum weight permitted by the first one of the at least two containers.

16. The method of claim 15, further comprising, by the control circuit, selecting, for an initial product merging in a group of the containers that are eligible for the product merging therebetween, a container having a highest space utilization value and a container having a lowest space utilization value.

17. The method of claim 14, further comprising, after the product merging between two containers of a group of product merging eligible containers at the at least one picking station, determining by the control circuit that one of the containers in the group of the containers is not eligible for further product merging and to remove the one of the containers from the product merging eligible group.

18. The method of claim 17, further comprising:
conveying the containers via a main conveyor between the storage locations and the at least one picking station; and
conveying, via a transfer conveyor, the one of the containers determined by the control circuit to be not eligible for further product merging and removed from the product merging eligible group, from the at least one picking station to one of the storage structure and an empty container processing station.

19. The method of claim 11, further comprising detecting, via at least one sensor, a number of the products picked from at least a first one of the at least two containers at the at least one picking station and transferred into a second one of the at least two containers at the at least one picking station.

20. The method of claim 11 further comprising:
controlling at least one robotic arm of the at least one picking station by the control unit of the container transport system to perform the product merging between the containers at the at least one picking station; and
transmitting a third signal from the control circuit to the control unit of the container transport system to control movement of the at least one robotic arm.

* * * * *